(12) United States Patent
Harrington et al.

(10) Patent No.: US 7,159,821 B2
(45) Date of Patent: *Jan. 9, 2007

(54) INTEGRATED TRANSPORT SYSTEM FOR OVERHEAD STOWAGE

(75) Inventors: Anthony A. Harrington, Granite Falls, WA (US); Paul M. Wojciechowski, Bothell, WA (US)

(73) Assignee: The Boeing Company, Chicago, IL (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/709,777

(22) Filed: May 27, 2004

(65) Prior Publication Data

US 2005/0230540 A1    Oct. 20, 2005

Related U.S. Application Data

(63) Continuation-in-part of application No. 10/708,955, filed on Apr. 2, 2004, now Pat. No. 6,971,608.

(51) Int. Cl.
*B64C 1/20* (2006.01)

(52) U.S. Cl. .................................. 244/118.5

(58) Field of Classification Search ... 244/118.1–118.6
See application file for complete search history.

(56) References Cited

U.S. PATENT DOCUMENTS

| | | | | |
|---|---|---|---|---|
| 3,601,134 A | * | 8/1971 | Benjamin | 134/46 |
| 3,701,396 A | * | 10/1972 | House | 188/21 |
| 4,055,317 A | * | 10/1977 | Greiss | 244/118.5 |
| RE32,176 E | * | 6/1986 | Vernon | 244/118.5 |
| 4,653,707 A | * | 3/1987 | Hamilton et al. | 244/137.2 |
| 4,660,787 A | * | 4/1987 | Sprenger et al. | 244/118.5 |
| 5,074,496 A | * | 12/1991 | Rezag et al. | 244/118.1 |
| 5,159,994 A | * | 11/1992 | Luria | 186/40 |
| 5,205,515 A | * | 4/1993 | Luria | 244/118.5 |
| 5,314,143 A | * | 5/1994 | Luria | 244/118.1 |
| 5,322,244 A | * | 6/1994 | Dallmann et al. | 244/118.5 |
| 5,474,260 A | * | 12/1995 | Schwertfeger et al. | 244/118.5 |
| 5,496,000 A | * | 3/1996 | Mueller | 244/118.1 |
| 5,525,026 A | * | 6/1996 | DeMonte et al. | 414/542 |
| 5,727,654 A | * | 3/1998 | Roessner et al. | 186/40 |
| 5,759,005 A | * | 6/1998 | Roessner et al. | 414/280 |
| 6,059,229 A | * | 5/2000 | Luria | 244/118.1 |
| 6,073,883 A | | 6/2000 | Ohlmann et al. | |
| 6,290,181 B1 | * | 9/2001 | Gadd et al. | 244/171.9 |

(Continued)

*Primary Examiner*—Teri Pham Luu
*Assistant Examiner*—Stephen A Holzen
(74) *Attorney, Agent, or Firm*—Ostranger Chong Flaherty & Broitman P.C.

(57) ABSTRACT

One advantageous embodiment of the present invention is an integrated transport system (14) for moving an object (20) in an aircraft (10) between a main cabin (16) and an overhead cabin (18) via a shaft (24) in connection therebetween. This integrated transport system (14) includes a single-unit gantry-lift device (42) with an object carrier (32) for receiving the object (20). This object carrier (32) has one or more restraint members (34, 38) for securing the object (20) in the object carrier (32) and preventing the object (20) from inadvertently tipping or falling out of the object carrier (32). In this embodiment, the single-unit gantry-lift device (42) further includes a lift device (46) for moving the object carrier (32) generally along a longitudinal axis (22) of the shaft (24) and a gantry device (44) for moving the object carrier (32) generally along a first axis (26) of the overhead cabin (18) and/or a second axis (28), which is disposed generally perpendicular to the first axis (26).

14 Claims, 17 Drawing Sheets

U.S. PATENT DOCUMENTS

| | | | |
|---|---|---|---|
| 6,305,643 B1 * | 10/2001 | Sankrithi | 244/118.1 |
| 6,340,136 B1 * | 1/2002 | Luria | 244/118.1 |
| 6,412,603 B1 * | 7/2002 | Nervig et al. | 187/267 |
| 6,454,208 B1 * | 9/2002 | Nervig et al. | 244/118.1 |
| 6,464,169 B1 * | 10/2002 | Johnson et al. | 244/118.5 |
| 6,484,969 B1 * | 11/2002 | Sprenger et al. | 244/118.5 |
| 6,547,183 B1 * | 4/2003 | Farnsworth | 244/118.1 |
| 6,616,098 B1 | 9/2003 | Mills | |
| 6,663,043 B1 * | 12/2003 | Luria | 244/118.1 |
| 6,808,142 B1 * | 10/2004 | Oki | 244/118.1 |
| 6,971,608 B1 * | 12/2005 | Harrington et al. | 244/118.5 |
| 6,988,760 B1 * | 1/2006 | Rasmussen | 296/156 |
| 2002/0148928 A1 * | 10/2002 | Oki | 244/118.1 |
| 2003/0025036 A1 * | 2/2003 | Farnsworth | 244/118.1 |
| 2003/0132344 A1 * | 7/2003 | Johnson et al. | 244/118.5 |
| 2004/0026349 A1 * | 2/2004 | Colgate et al. | 212/284 |
| 2004/0188564 A1 * | 9/2004 | Boe et al. | 244/118.1 |
| 2005/0218265 A1 * | 10/2005 | Harrington et al. | 244/118.5 |
| 2005/0230540 A1 * | 10/2005 | Harrington et al. | 244/118.2 |
| 2005/0244254 A1 * | 11/2005 | Schratt et al. | 414/281 |

* cited by examiner

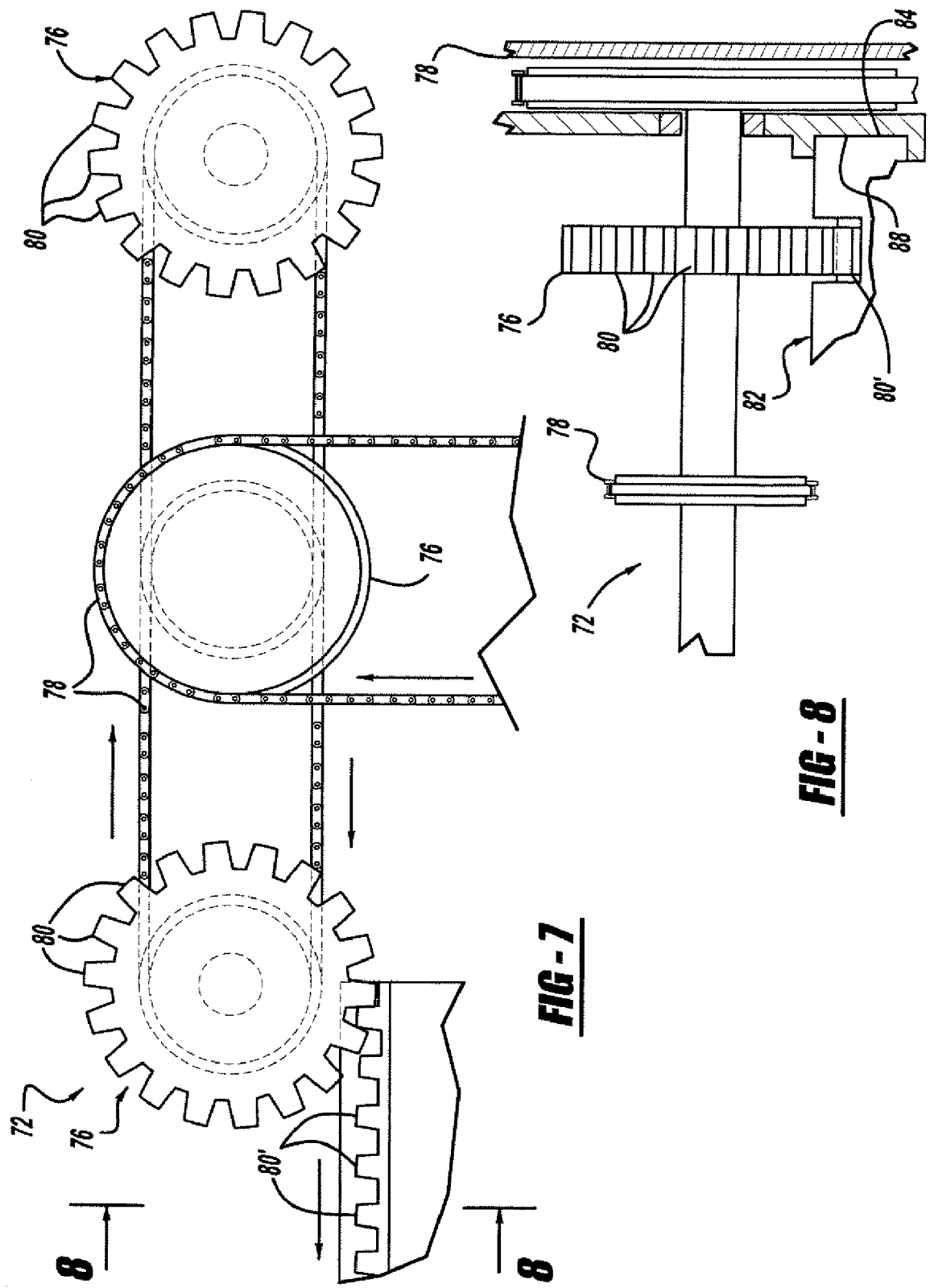

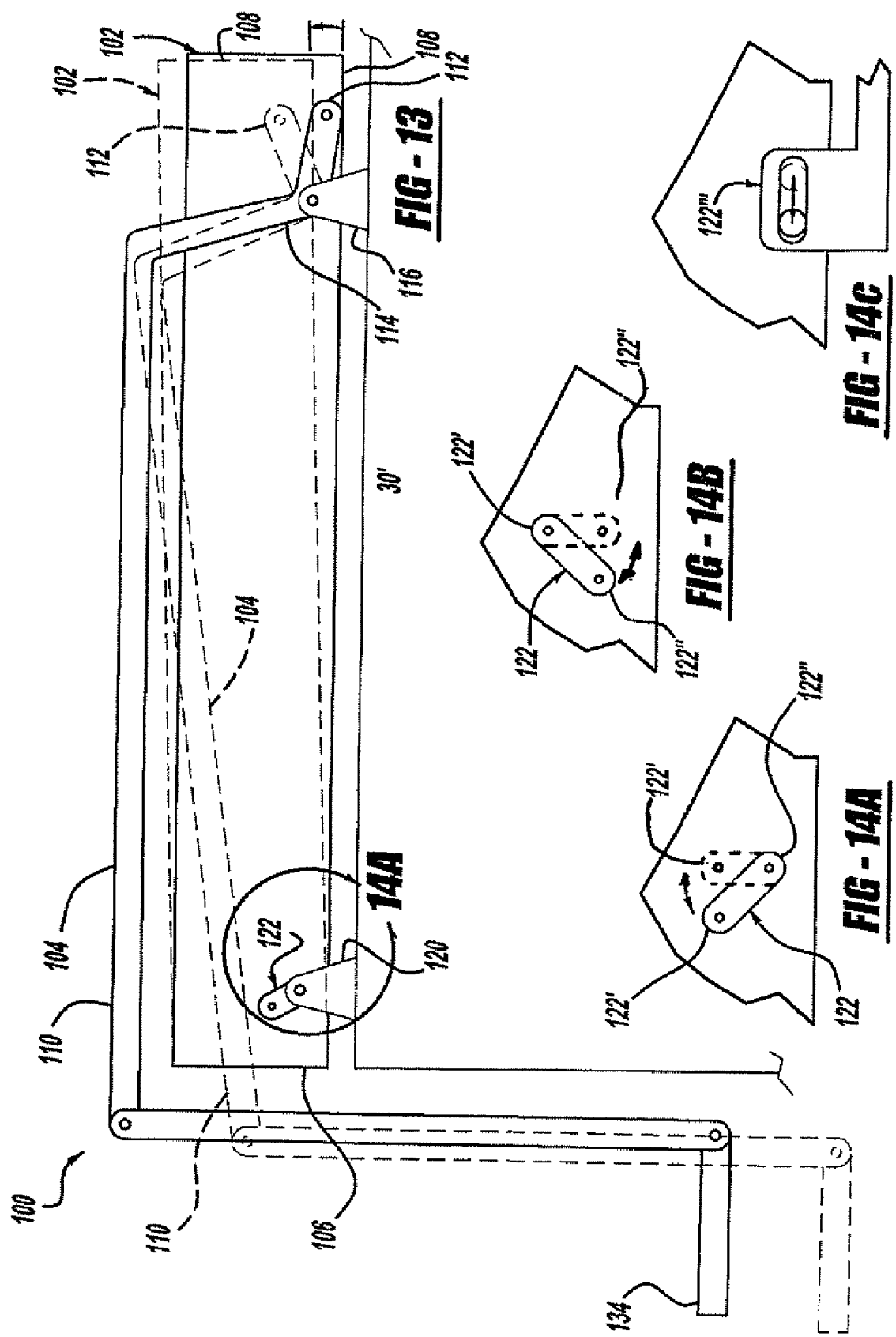

INTEGRATED TRANSPORT SYSTEM FOR OVERHEAD STOWAGE

The present application is a continuation-in-part of U.S. application Ser. No. 10/708,955 entitled "AN INTEGRATED TRANSPORT SYSTEM AND METHOD FOR OVERHEAD STOWAGE AND RETRIEVAL," and filed on Apr. 2, 2004 now U.S. Pat. No. 6,971,608.

BACKGROUND OF INVENTION

The present invention relates generally to aircrafts, and more particularly to an integrated transport system and method for moving an object within a bi-level cabin.

Aircraft manufacturers are well known for producing aircrafts having constructions that maximize the use of space within those aircrafts. For example, certain commercial airplanes can have automated elevator systems for vertically moving galley carts between a main deck galley and a lower lobe of the airplane. In this way, the galley carts can be stored in the lower lobe. For that reason, the main-deck passenger cabin can be sized larger than it would otherwise have been if those carts were stored on the main deck. This construction is beneficial because it can allow the manufacturer to increase the number of passenger seats, maintain the number of seats while increasing the size of the passenger seats, increase the room within which the passengers and the crewmembers can move about the aircraft, or provide various other advantages.

Furthermore, a typical galley cart can weigh a substantially high amount and therefore can be somewhat cumbersome to store, retrieve, or otherwise manipulate within an aircraft. This substantially high weight typically is attributed to the meals, beverages, trash, and various other items carried by the cart, as well as the cart itself. For instance, one skilled in the art understands that a typical galley cart can weigh up to about 250 pounds or more.

Therefore, it would be desirable to further improve the movement of galley carts, cargo, or other objects within a vehicle or building, and enhance the use of space within that vehicle or building.

SUMMARY OF INVENTION

One embodiment of the present invention is an integrated transport system for moving an object in an aircraft between a main cabin and an overhead cabin via a shaft in connection therebetween. This integrated transport system includes a single-unit gantry-lift device with an object carrier for receiving the object. This object carrier has one or more restraint members for securing the object in the object carrier and preventing the object from tipping.

The single-unit gantry-lift device further includes a lift device for moving the object carrier generally along a longitudinal axis of the shaft. Moreover, the single-unit-gantry-lift device also includes a gantry device for moving the object carrier generally along a first axis of the overhead cabin and/or a second axis, which is disposed generally perpendicular to the first axis.

One advantage of the invention is that an integrated transport system is provided that can transfer a substantially heavy object with a substantially low risk of the object tipping and falling.

Another advantage of the present invention is that an integrated transport system is provided that can quickly and easily move an object within an aircraft.

Yet another advantage of the present invention is that an integrated transport system is provided with a simple construction for providing ease of manufacture, minimizing the costs associated therewith, and facilitating the installation of the integrated transport system.

Still another advantage of the present invention is that an integrated transport system is provided that can increase the available space on a main deck of an aircraft.

Yet another advantage of the present invention is that an integrated transport system is provided that can preserve the payload capacity of a lower lobe or cargo bay of an aircraft.

Still another advantage of the present invention is that an integrated transport system is provided that can be manually operated for eliminating the power requirements, maintenance costs, and likelihood of malfunctions, which are typically associated with automated transport systems.

The features, functions, and advantages can be achieved independently and in various embodiments of the present invention or may be combined in yet other embodiments.

BRIEF DESCRIPTION OF DRAWINGS

For a more complete understanding of this invention, reference should now be made to the embodiments illustrated in greater detail in the accompanying drawings and described below by way of examples of the invention:

FIG. 7 is a partially cutaway plan view of the unloading mechanism shown in FIG. 6;

FIG. 8 is a cutaway view of the unloading mechanism shown in FIG. 7, as taken along line 8—8;

FIG. 13 is a side view of the deployable receptacle shown in FIGS. 11A and 11B, illustrating the deployable cart being movable between a storing position and a deploying position;

FIG. 14A is a cutaway view of the deployable receptacle shown in FIG. 13, as taken within circle 14A, illustrating a pivotal coupling for moving the deployable receptacle between the storing position and the deploying position;

FIG. 14B is a cutaway view of the deployable receptacle shown in FIG. 14A, illustrating the pivotal coupling according to another advantageous embodiment of the claimed invention;

FIG. 14C is a cutaway view of the deployable receptacle shown in FIG. 14A, illustrating the pivotal coupling according to yet another advantageous embodiment of the claimed invention;

DETAILED DESCRIPTION

Figure 1:
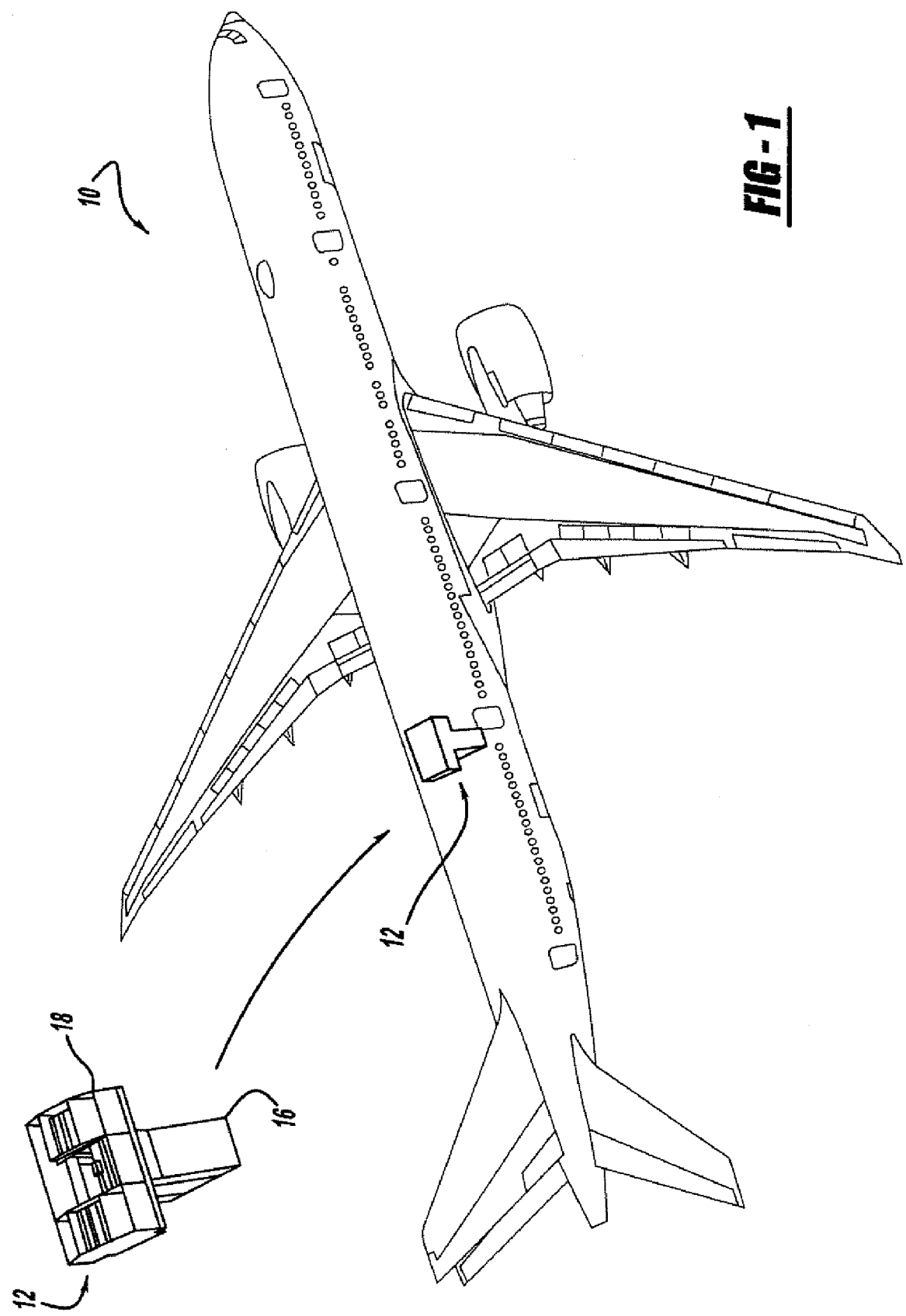
FIG. 1 is a perspective view of an aircraft having a bi-level galley module with an integrated transport system, according to one embodiment of the claimed invention.

In the following figures the same reference numerals are utilized for designating the same or similar components in the various views. Moreover, the illustrated embodiments described herein employ features where the context permits, e.g. when a specific result or advantage of the claimed invention is desired. Specifically, the embodiments described herein implement an integrated transport system for moving a galley cart between an overhead sub-module and a main-deck sub-module of a bi-level galley module that is installed in an aircraft. However, it is contemplated that the integrated transport system can be utilized for various other suitable vehicles, buildings, and other environments that require overhead storage. In addition, it will be appreciated that the integrated transport system can be utilized for moving a variety of suitable objects besides galley carts. In this vein, various embodiments are contemplated having different combinations of the described features, having features other than those described herein, or lacking one or more of those features. For these reasons, it is understood that the invention can be carried out in various suitable modes.

Figure 2:
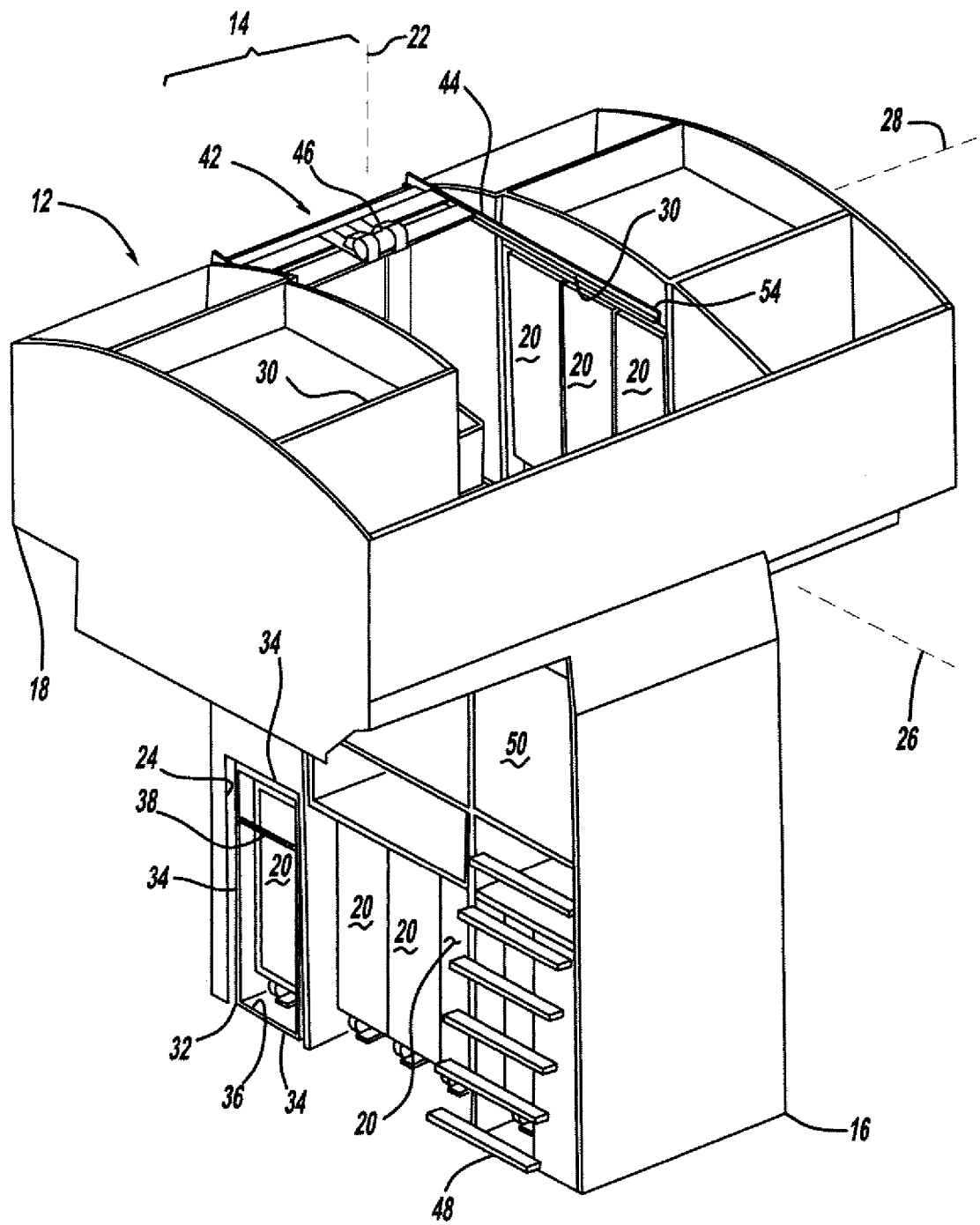
FIG. 2 is a perspective view of the bi-level galley module shown in FIG. 1.
Figure 3A:
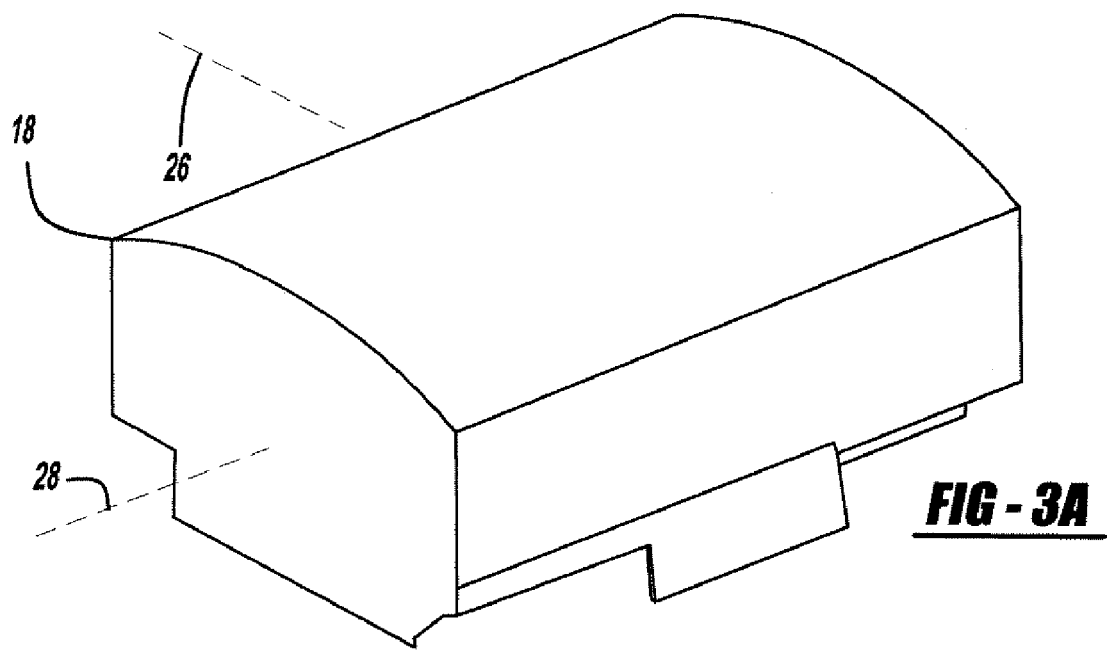
FIG. 3A is a perspective view of an overhead sub-module of the bi-level galley module shown in FIG. 2.
Figure 3B:
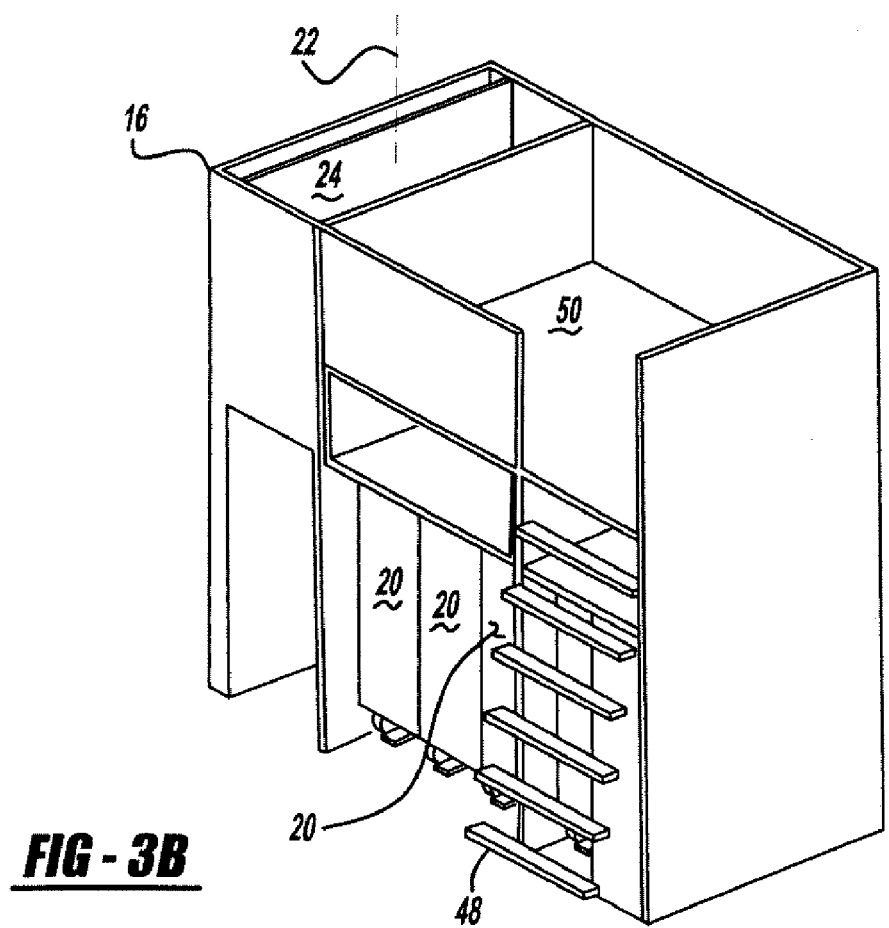
FIG. 3B is a perspective view of a main-deck sub-module of the bi-level galley module shown in FIG. 2.

Referring to FIG. 1, there is shown a commercial airplane 10 having a bi-level galley module 12 with an integrated transport system 14 (best shown in FIGS. 4A–4D), according to one advantageous embodiment of the invention. With attention to FIG. 2, the bi-level galley module 12 includes a main-deck sub-module 16 (best shown in FIG. 3A) and an overhead sub-module 18 (best shown in FIG. 3B) that is disposed above the main-deck sub-module 16. However, it will be appreciated that the airframe of the airplane 10 can instead define a bi-level galley in various other suitable constructions besides a modular one.

The bi-level galley module 12 is utilized for storing a series of galley carts 20 in the main-deck sub-module 16 and/or the overhead sub-module 18. In this way, the bi-level galley module 12 can store about twice as many galley carts 20 as a single-level galley module having a similarly-sized perimeter. This feature is beneficial because it can decrease the overall number of galleys in the airplane and increase the amount of available space on the main deck. One skilled in the art will understand that this additional space can be utilized for hosting additional passenger seats, maintaining the same number of passenger seats while increasing their size, increasing the available room within which the passengers and the crewmembers can move about the airplane 10, providing various other advantages, or any suitable combination thereof as desired. In addition, in this embodiment, it will be appreciated that this bi-level galley module 12 does not occupy any space in the lower lobe or cargo bay of the airplane 10. In this regard, the bi-level galley module 12 is further beneficial for preserving the payload capacity of the airplane 10. For these reasons, it is understood that the integrated transport system 14 can improve the efficiency of the airplane 10 as a vehicle for transporting persons, luggage, and various other items. It is also understood that the bi-level galley module 12 can store various other suitable objects besides galley carts 20 as desired.

Figure 4A:
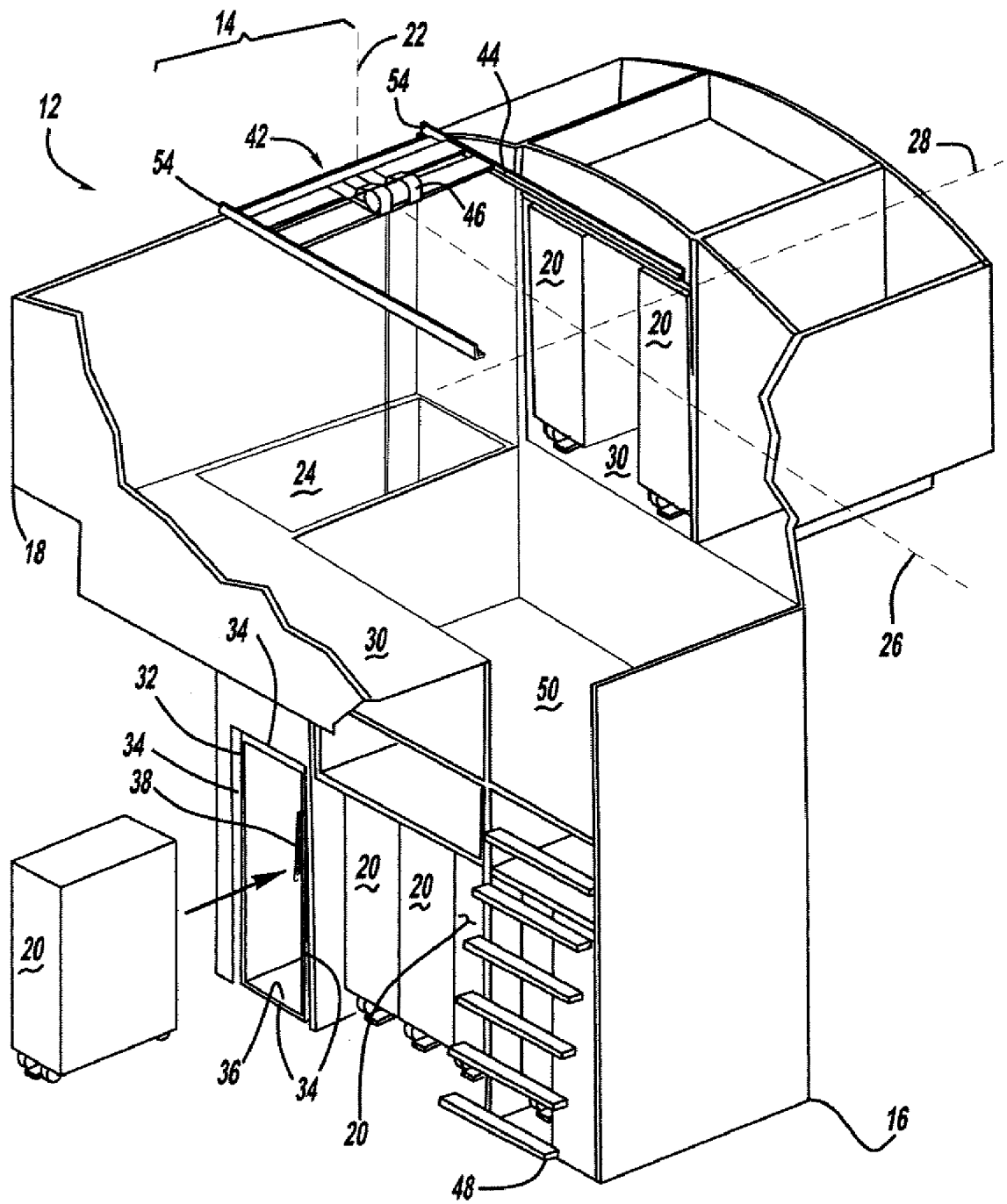
FIGS. 4A–4D are partially cutaway perspective views of the bi-level galley module shown in FIG. 2, sequentially illustrating the integrated transport system moving a galley cart from the main-deck sub-module to the overhead sub-module for storage therein.
Figure 4B:
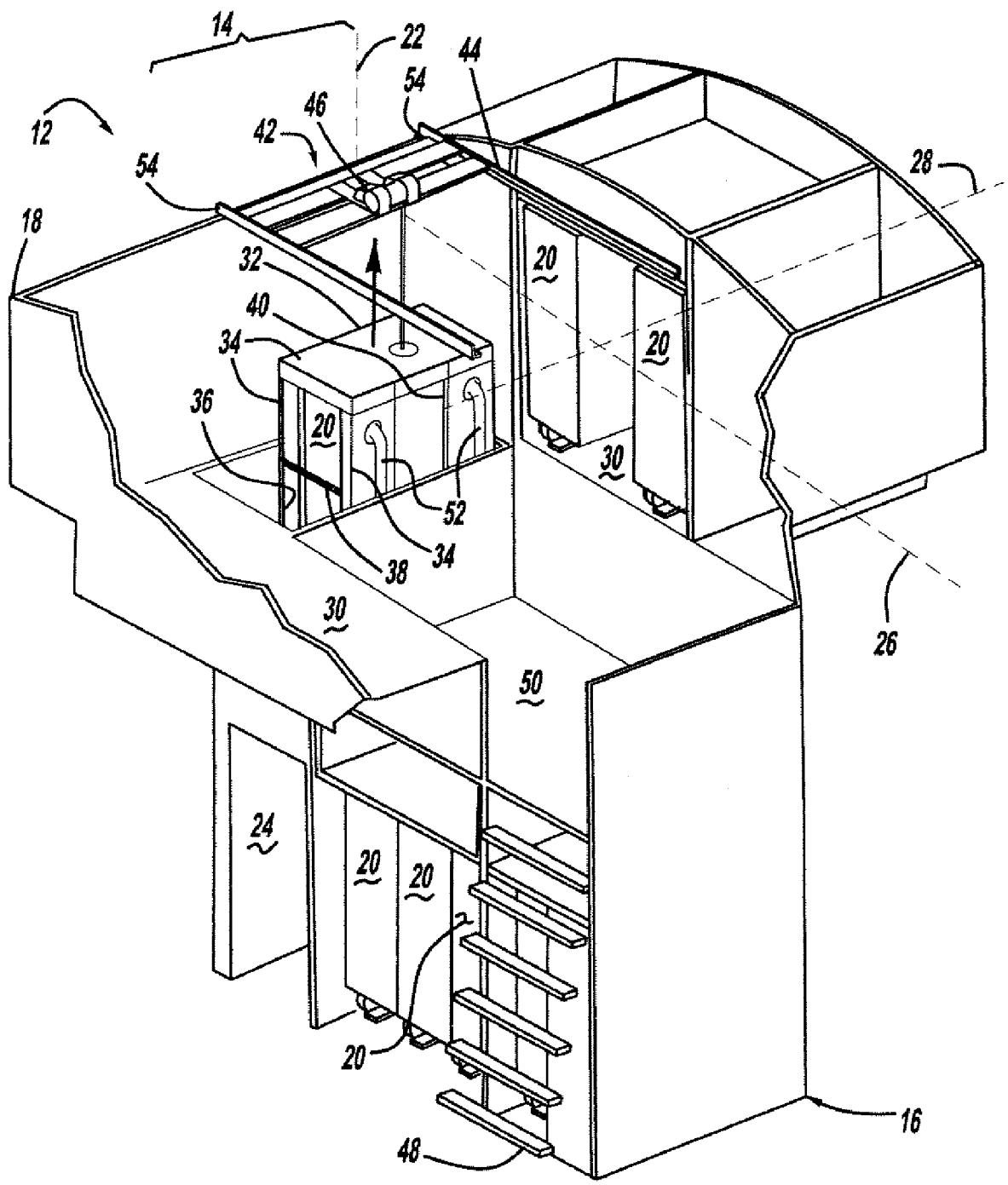
Figure 4C:
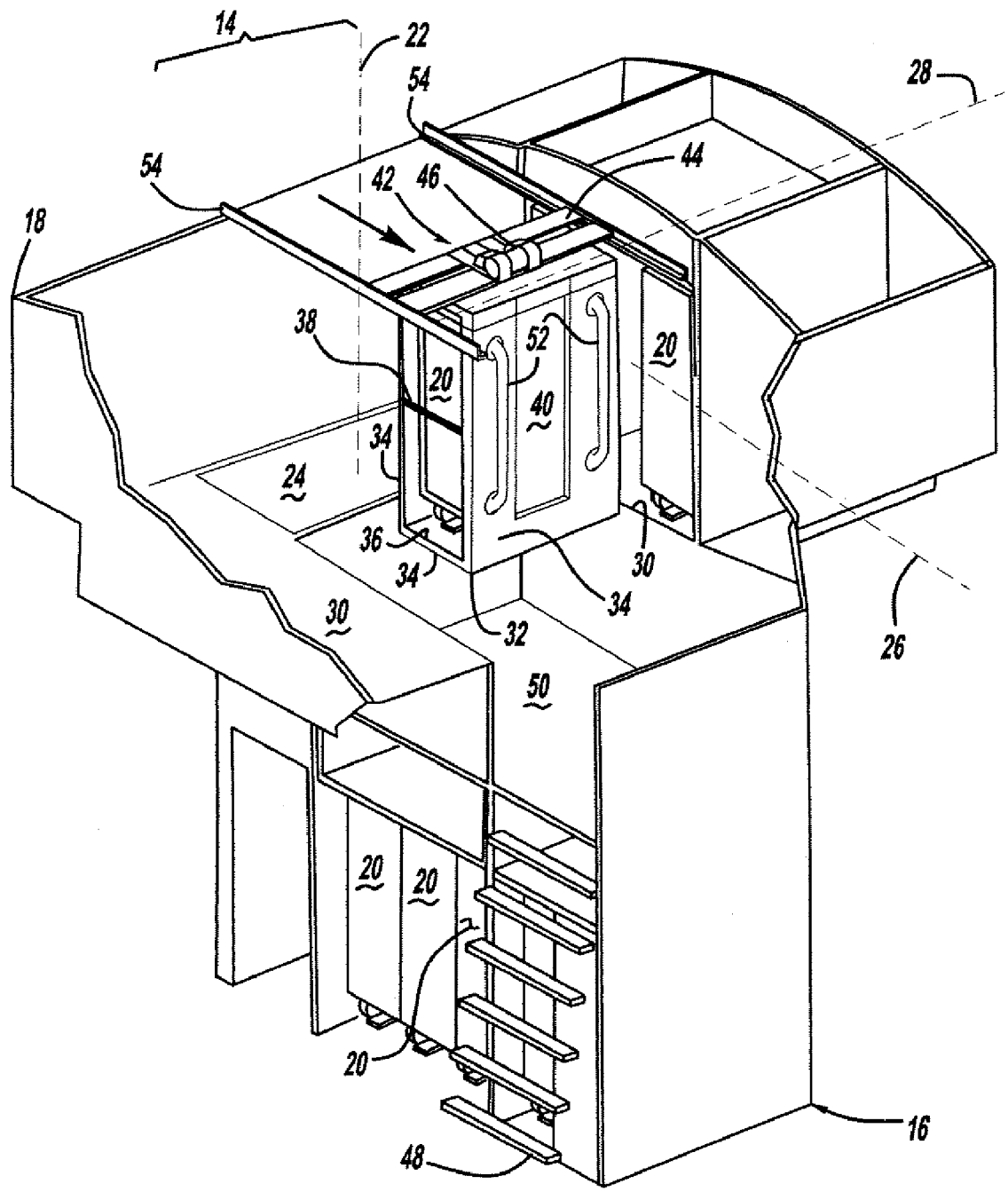
Figure 4D:
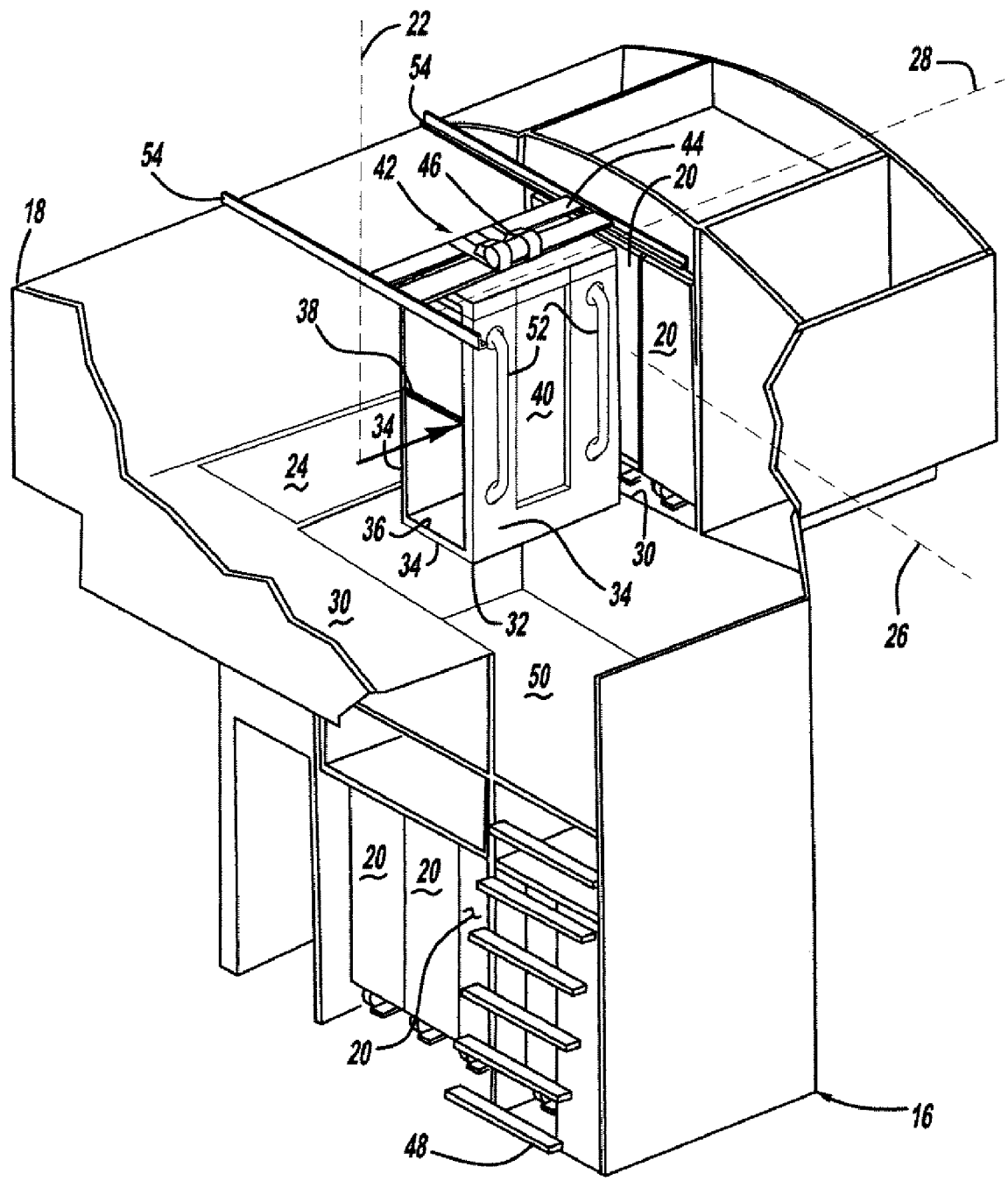

Referring now to FIGS. 4A–4D, there generally is shown the sequential operation of the integrated transport system 14 for storing a galley cart 20 in the overhead sub-module 18. Specifically, FIG. 4A shows the galley cart 20 being secured to the integrated transport system 14. Furthermore, FIG. 4B illustrates the integrated transport system 14 moving the galley cart 20 upward generally along a longitudinal axis 22 of a shaft 24, which extends between the main-deck sub-module 16 and the overhead sub-module 18. Additionally, FIG. 4C shows the integrated transport system 14 moving the galley cart 20 along a first axis 26 of the overhead sub-module 18. Finally, FIG. 4D illustrates the integrated transport system moving the galley cart 20 generally along a second axis 28 for placing the galley cart 20 in a storage area 30 of the overhead sub-module 18.

Referring back to FIG. 4A, the integrated transport system 14 includes a cart carrier 32 for receiving the galley cart 20. This cart carrier 32 includes one or more restraint members for securing the galley cart 20 to the cart carrier 32 and preventing the galley cart 20 from tipping over or otherwise falling from the cart carrier 32. This feature is advantageous because it can substantially improve the safety of storing, retrieving, or otherwise transporting galley carts, which can weigh in up to 250 pounds or more.

In this embodiment, the restraint members are a series of interconnected plate members 34, which form a box construction defining the cart carrier 32. These plate members 34 are integral parts of the one-piece box construction. However, it will be appreciated that the plate members 34 can be separate components welded or otherwise fastened together by various suitable fasteners. Furthermore, it is also contemplated that the restraint members can instead be netting members, belt members, rope members, or any combination thereof as desired. In addition, it is also understood that the cart carrier 32 can have other suitable shapes besides a box construction.

The box construction includes one or more opposing open faces 36 for allowing the galley cart 20 to enter or exit the cart carrier 32. One or more rope members 38 can be secured across the open faces 36 via suitable fasteners, e.g. a cord with a hook-and-loop fastener, for preventing the galley cart 20 from moving out of the cart carrier 32. Furthermore, as detailed in the description got FIG. 4D, one or more of the plate members 34 has one or more openings 40 formed therethrough for allowing a crewmember to reach into the cart carrier 32, grab hold of the galley cart 20, and manually force the galley cart 20 out of the cart carrier 32. It will also be appreciated that these openings 40 can decrease the amount of material comprising the cart carrier 32 thereby decreasing the material costs of the cart carrier 32, and minimizing the amount of weight carried by the airplane 10.

Referring back to FIG. 4B, the single-unit gantry-lift device 46 further includes a lift device 46 coupled to the cart carrier 32 for raising and lowering the cart carrier 32 along the longitudinal axis 22 of the shaft 24. In this way, the cart carrier 32 and the galley cart 20 contained therein can be moved between the main-deck sub-module 16 and the overhead sub-module 18. This lift device 46 is a motorized pulley mechanism. However, it is contemplated that the lift device 46 can instead be a screw mechanism, a gear mechanism, manually operated or otherwise, or any suitable combination thereof as desired.

Moreover, the single-unit gantry-lift device 46 further includes a gantry device 44, which is coupled to the lift device 46. As best shown in FIG. 4C, this gantry device 44 is utilized for moving the lift device 46 and the cart carrier 32 along the first axis 26 of the overhead sub-module 18 to a point adjacent to an open or available section of the storage area 30. Specifically, a crewmember can climb a ladder 48, enter the overhead sub-module 18 via a walkway 50 in the overhead sub-module 18, grab hold of one or more handles 52 extending from the cart carrier 32, and pull the cart carrier 32 along the first axis 26. In this way, the crew member can utilize the gantry device 44 for moving the galley cart 20 next to its final destination in the storage area 30.

To that end, the gantry device 44 includes a pair of rails 54, which is mounted to the overhead sub-module 18 via bolt fasteners or other suitable fasteners. These rails 54 are utilized for suspending the lift device 46 and the cart carrier 32 therefrom and preventing the cart carrier 32 from tipping and causing the galley cart 20 to fall from the cart carrier 32. Moreover, in accordance with the aforementioned, each rail 54 is substantially aligned with the first axis 26 of the overhead sub-module 18 for moving the lift device 46 and the cart carrier 32 along the first axis 26 of the overhead sub-module 18.

Figure 5A:
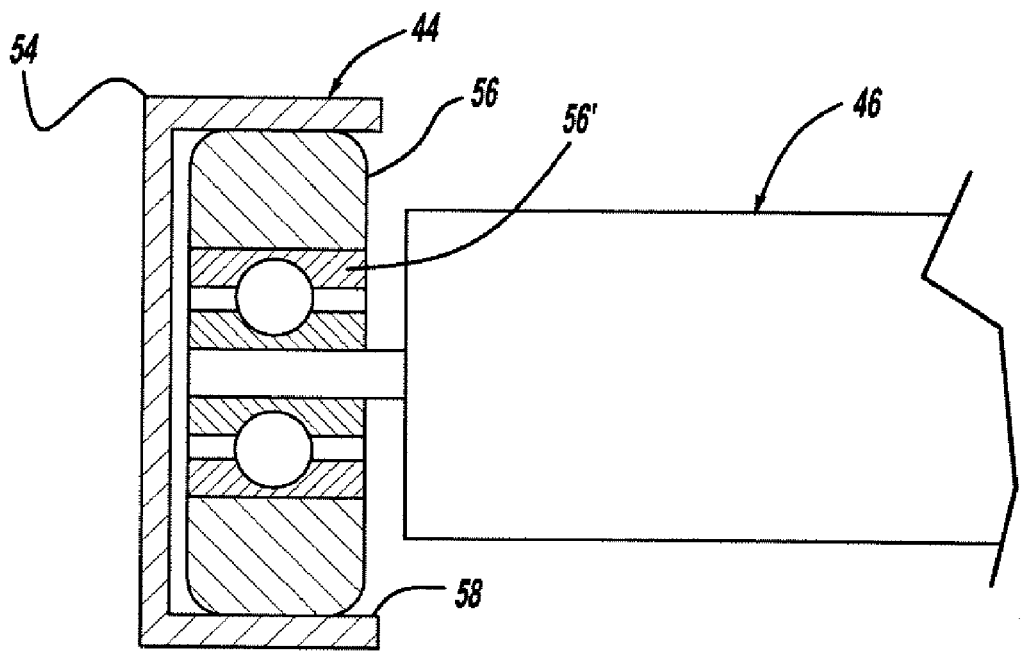
FIG. 5A is a cross-sectional view of a gantry device of the integrated transport system, shown in FIGS. 4A–4D.

As best shown in FIG. 5A, these rails 54 and the lift device 46 have two or more rolling members 56 coupled therebetween. In this respect, a fifth-percentile female can apply a substantially low force for moving the lift device 46, the cart carrier 32, and a substantially heavy galley cart 20 along the first axis 26. In this embodiment, rolling members 56 are conventional wheels that are secured within a track 58 defined by each rail 54. Each wheel and each respective rail 54 have a ball-bearing coupling 56' therebetween for minimizing the force required to move the lift device 46 and the cart carrier 32 along the rails 54. However, it is understood that other suitable rotatable couplings can be utilized as desired.

Figure 5B:
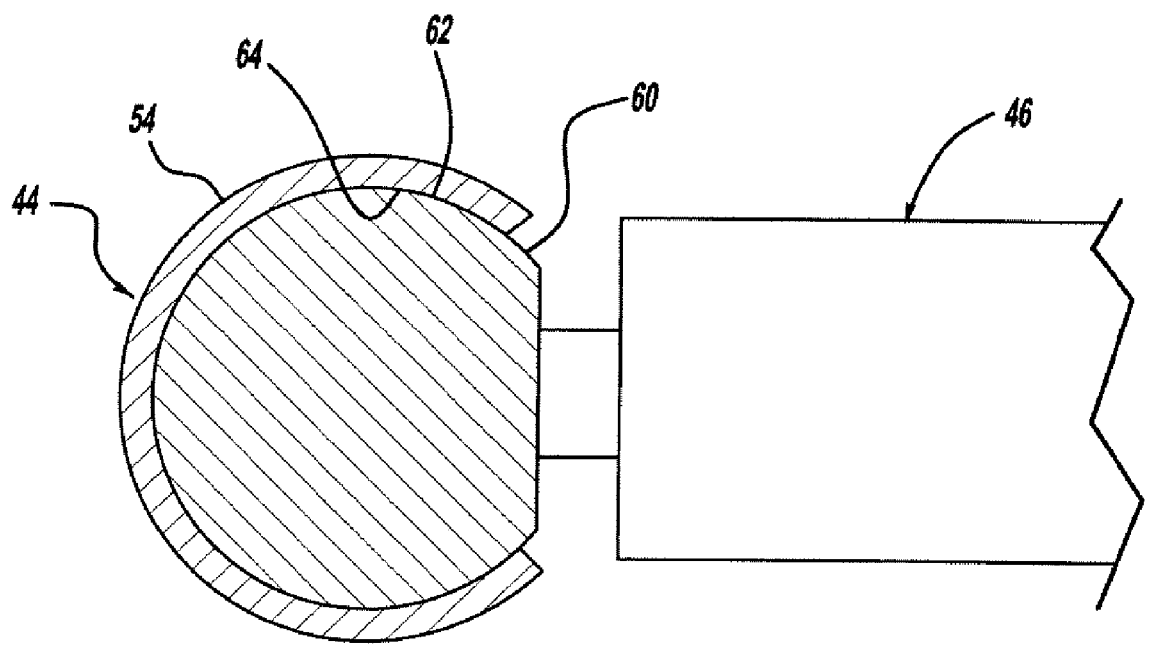
FIG. 5B is a cross-sectional view of a gantry device of the integrated transport system, shown in FIGS. 4A–4D, according to another advantageous embodiment of the claimed invention.

In another embodiment shown in FIG. 5B, the rails 54 and the lift device 46 have one or more sliding members 60 coupled therebetween. These sliding members 60 are truncated tubes secured within the tracks 58. These truncated tubes have a cross-sectional shape that is substantially similar to the cross-section of the rail 54. Additionally, the outer surface 62 of the truncated tube and the inner surface 64 of the track 58 are sufficiently smooth for allowing the truncated tubes to slide substantially across the length of the rails 54. It is contemplated that a variety of other suitable low-friction couplings besides sliding members 60 and rolling members 56 can be utilized as desired.

Referring back to FIG. 4D, the crewmember can reach through the opening 40 in the plate member 34, grab hold of the galley cart 20, and move the galley cart 20 along the second axis 28 between the cart carrier 32 and the storage area 30 of the overhead sub-module 18.

Figure 6:
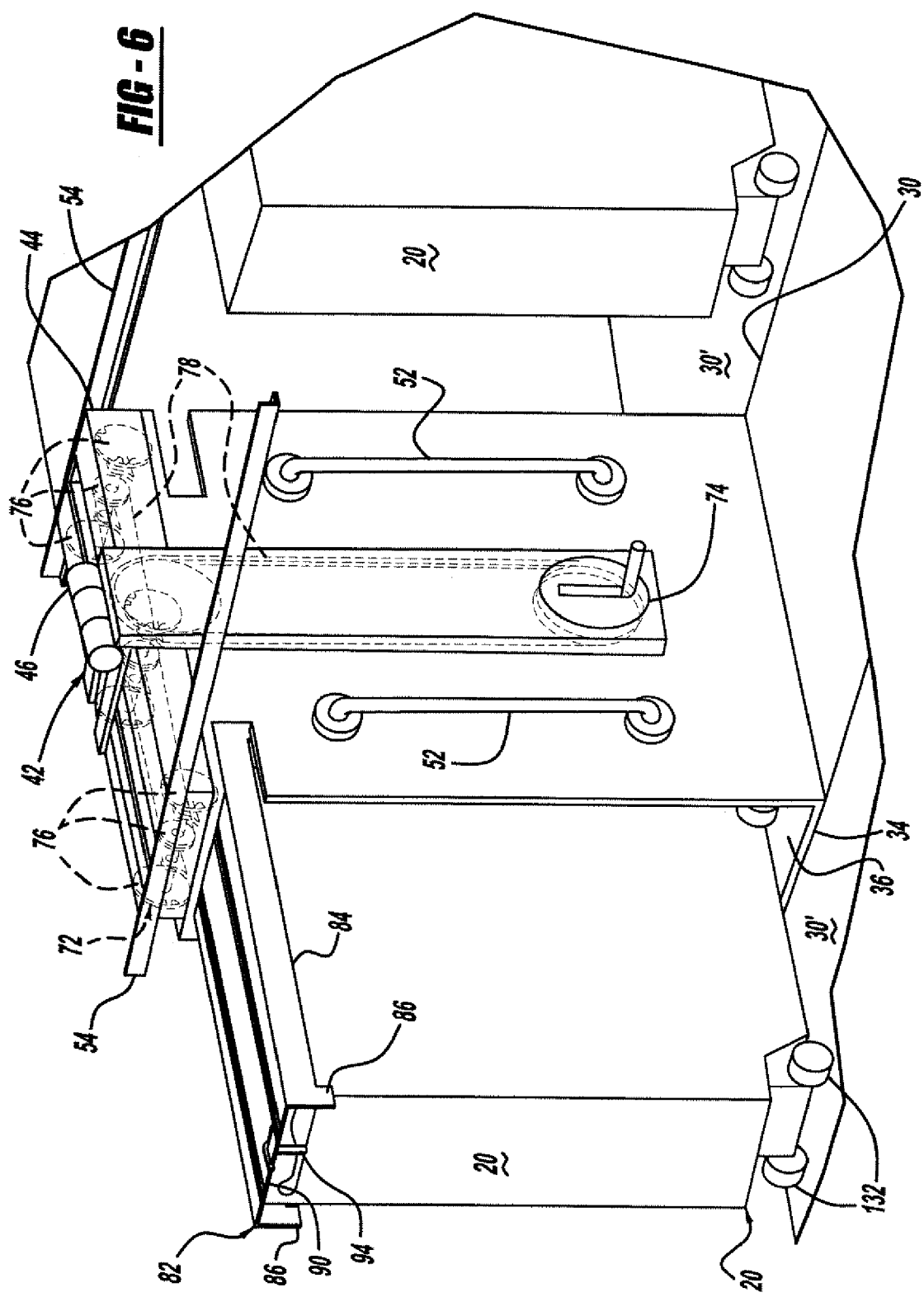
FIG. 6 is a perspective view of the cart carrier, shown in FIGS. 4A–4D, with an unloading mechanism for unloading the galley cart, according to one advantageous embodiment of the claimed invention.

In another embodiment, the cart carrier 32 includes an unloading mechanism for selectively attaching to the galley cart 20 and forcing the galley cart 20 out of the cart carrier 32. For example, as shown in FIG. 6, the unloading mechanism is a gear system 72 integrated within the cart carrier 32 and a fastener 82 coupled to the gear system 72. The gear system 72 includes a crank 74 for operation by a user. This crank 74 drives a one or more gears 76 coupled together via one or more chains 78. As best shown in FIGS. 7 and 8, each gear 76 has teeth 80 for contacting opposing teeth 80' formed in the fastener 82. This fastener 82 is selectively coupled to the galley cart 20 for forcing the galley cart 20 out of the cart carrier 32 in a direction generally along the second axis 28. As best shown in FIG. 8, the fastener 82 is an overhead tray with a pair of side rail portions 84, which slide within respective grooves 88 formed within the cart carrier 32. Furthermore, the side rail portions 84 include one or more detents 86 (shown in FIG. 6) for contacting the cart carrier 32 and preventing the overhead tray from sliding out of the grooves 88 and completely detaching from the cart carrier 32. In addition, as shown in FIG. 6, the overhead tray has opposing end portions 90 with a movable hook 92 coupled thereto for selectively attaching to an end of the galley cart 20. However, it is contemplated that the gear mechanism 72 and the fastener 82 can have various other suitable constructions as desired.

Figure 9:
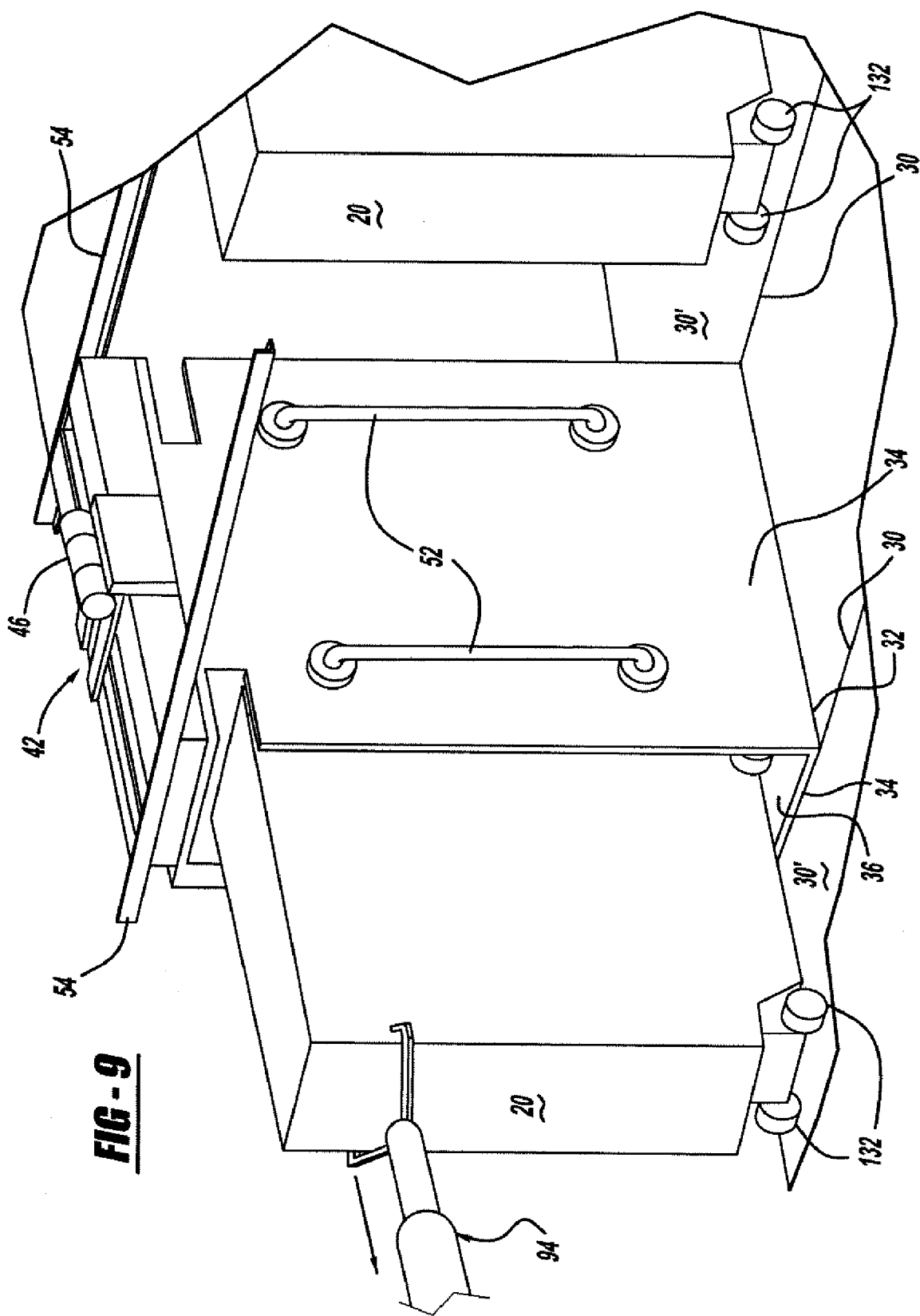
FIG. 9 is a perspective view of the cart carrier, shown in FIGS. 4A–4D, and an unloading mechanism for unloading the galley cart from the cart carrier, according to another advantageous embodiment of the claimed invention.

By way of another example illustrated in FIG. 9, the unloading mechanism can be a robotic arm 94 for grabbing hold of the galley cart 20 extracting the galley cart 20 from the cart carrier 32. This robotic arm 94 is pneumatically driven by way of a piston-driven mechanism or other suitable pressure source. However, it will be appreciated that the robotic arm 94 can instead be driven by a hydraulic power source, an electric servo motor, manual operation, any combination thereof, or various other suitable power sources as desired. It is also contemplated that the robotic arm 94 can push the galley cart 20 out of the carrier 32 instead of pulling the galley cart 20 therefrom as desired.

Figure 10:
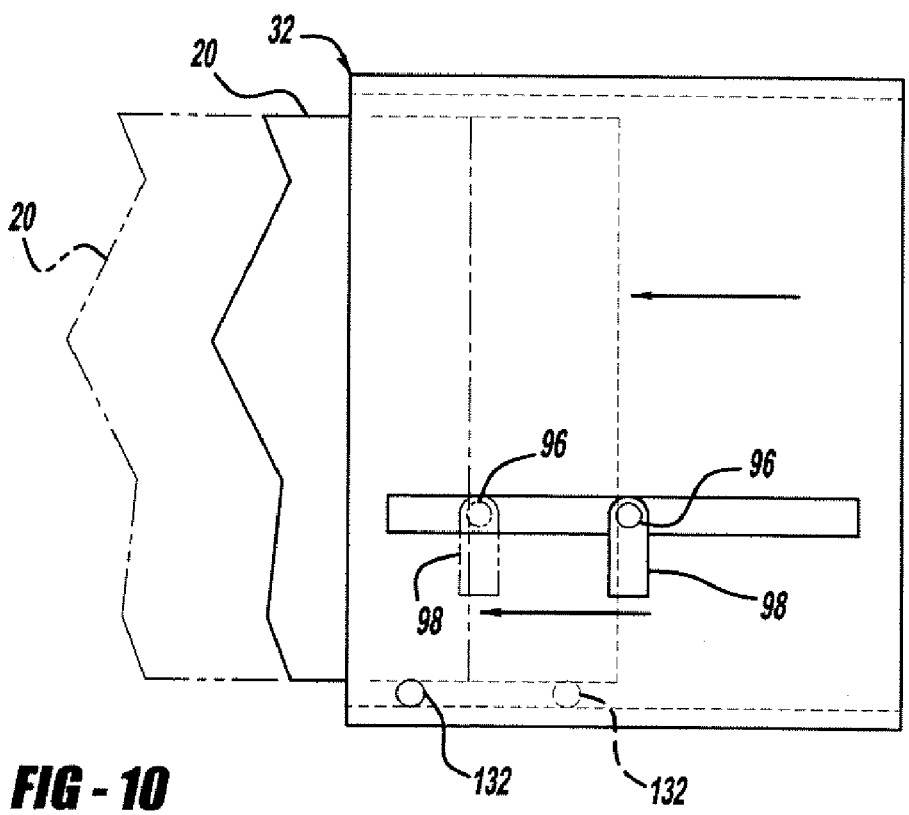
FIG. 10 is a perspective view of the cart carrier, shown in FIGS. 4A–4D, with an unloading mechanism for unloading the galley cart, according to still another advantageous embodiment of the claimed invention.

According to yet another example shown in FIG. 10, the unloading mechanism can be a bar member 96 positioned across an end of the galley cart 20. This bar member 96 can include a handle portion 98 for allowing an individual to force the bar member 96 and the galley cart 20 in a direction substantially along the second axis 28 of the overhead sub-module 18. It will be appreciated that a variety of suitable unloading mechanisms can be utilized for unloading the galley cart 20 from the cart carrier 32 as desired.

Figure 11A:
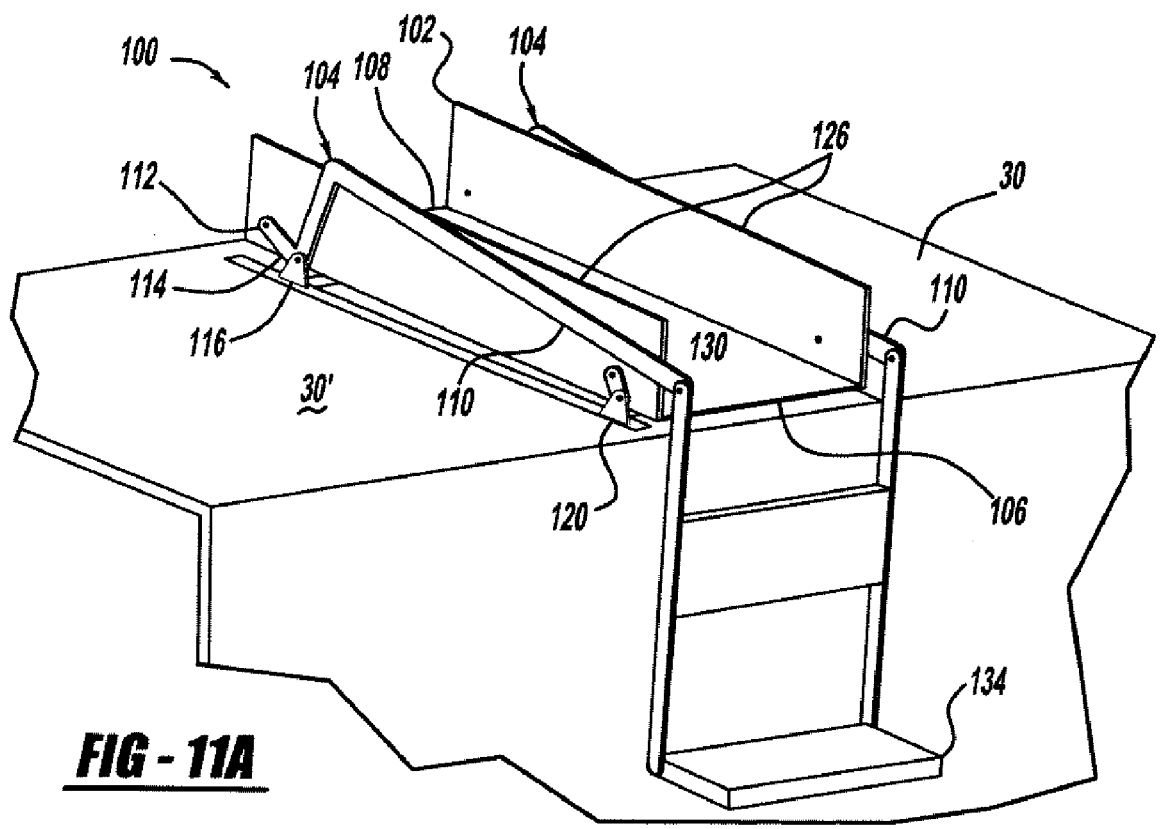
FIG. 11A is a perspective view of a deployable receptacle for storing the galley cart in the storage area of the overhead sub-module shown in FIGS. 4A–4D.
Figure 11B:
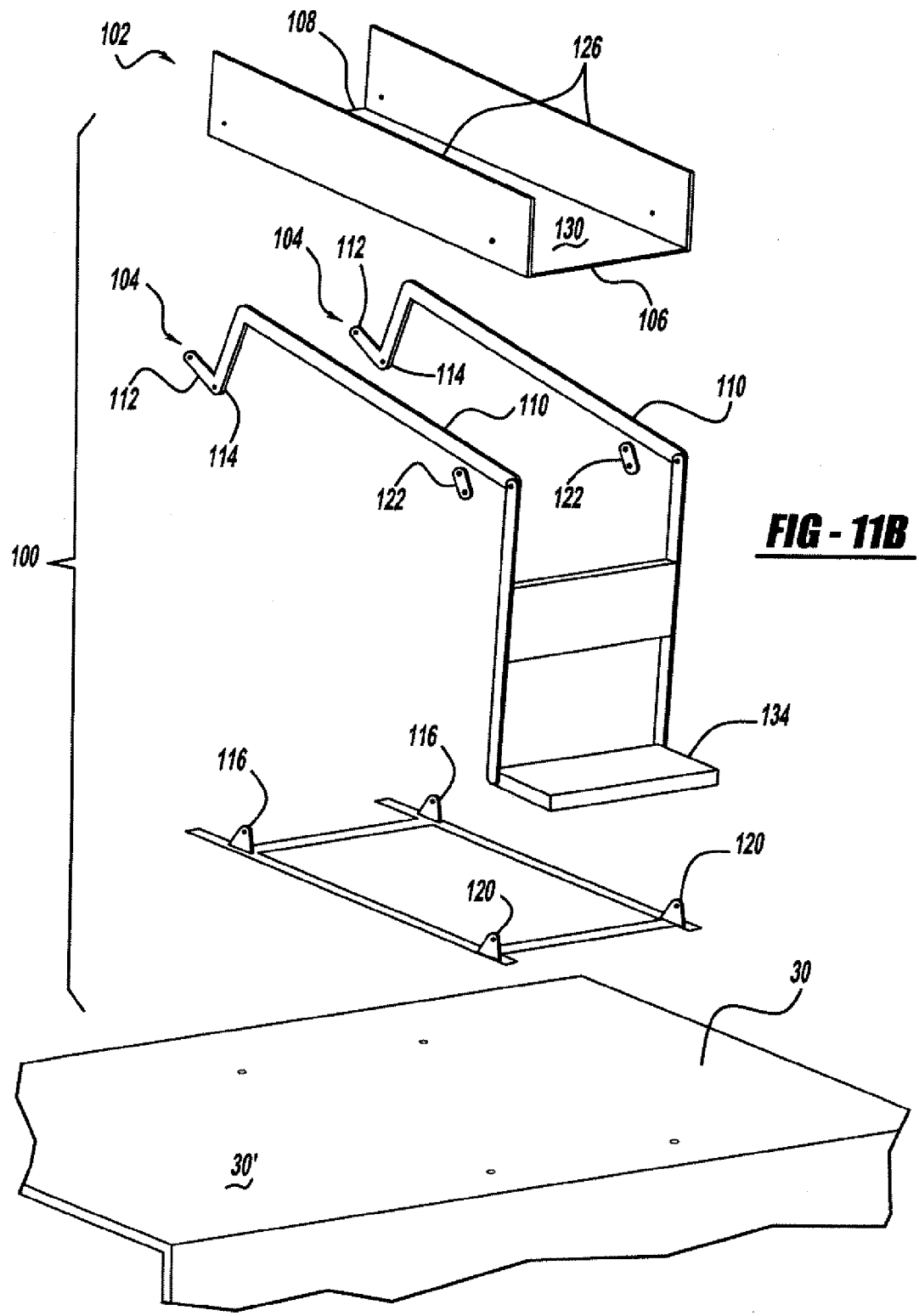
FIG. 11B is an exploded view of the deployable receptacle shown in FIG. 11A.

Referring to FIGS. 11A and 11B, there are shown perspective assembled and exploded views of a deployable receptacle 100 for storing the galley cart 20, according to one advantageous embodiment of the claimed invention. In this embodiment, the deployable receptacle 100 is utilized for storing a galley cart 32 and deploying a galley cart 32 therefrom. However, it is contemplated that the deployable receptacle 100 can be utilized for storing and deploying a variety of other suitable objects as desired.

Figure 12:
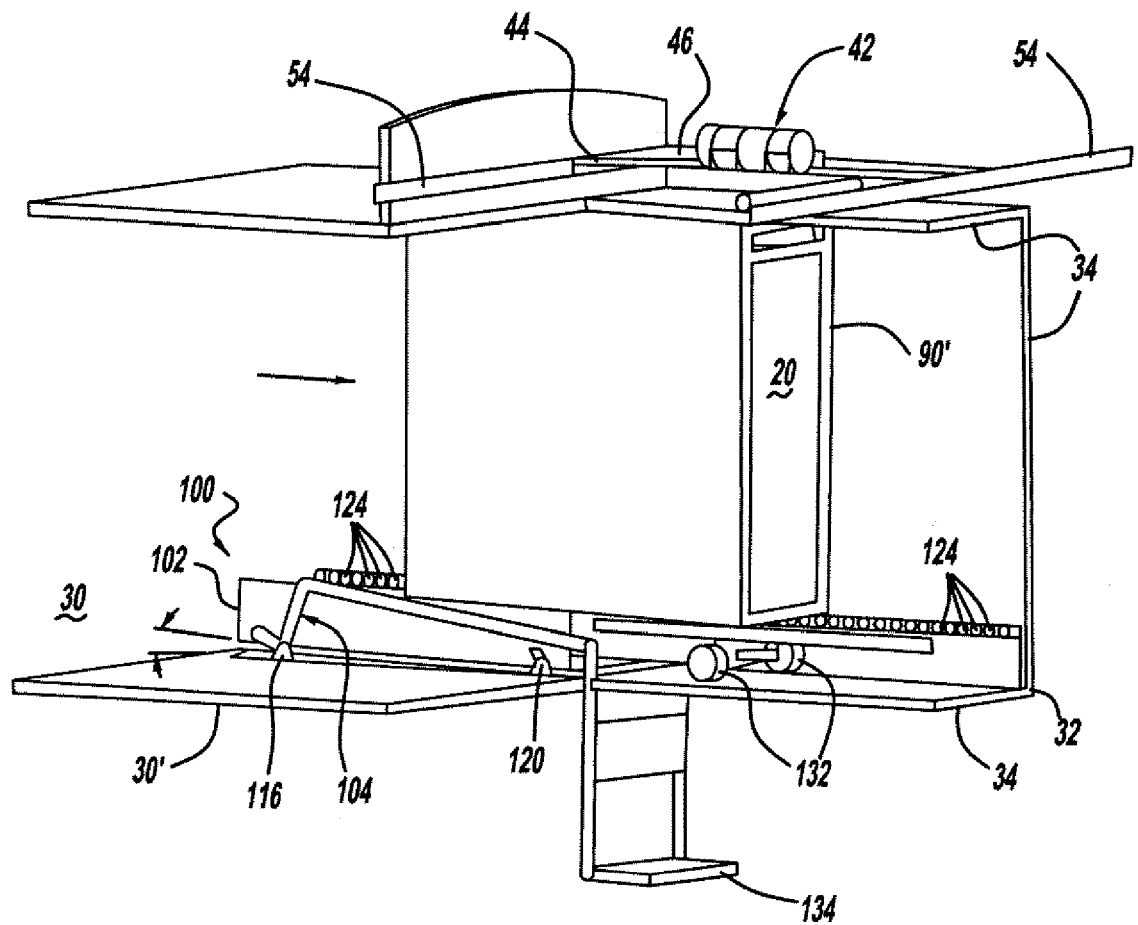
FIG. 12 is a cutaway perspective view of the deployable receptacle shown in FIGS. 11A and 11B, illustrating the deployable receptacle moving the galley cart from the receptacle to the cart carrier.

As best shown in FIGS. 12 and 13, the deployable receptacle 100 can be tilted at a predetermined angle for causing the galley cart 20 to roll out of the receptacle 100 into the cart carrier 32 or otherwise decrease the amount of force required to move the galley cart 20 into the cart carrier 32. This feature is beneficial because it can facilitate a person in moving a substantially heavy galley cart 32.

The deployable receptacle 100 includes a tray 102 for supporting the galley cart 20 thereon. As introduced above, this tray 102 is movable between a storing position for storing the galley cart 20 thereon and a deployable position for deploying the galley cart 20 therefrom. This tray 102 is substantially horizontal when it is disposed in the storing position, and is tilted at a predetermined angle, e.g. up to five degrees, when it is disposed in the deploying position. However, it will be appreciated that other suitable positions can be utilized instead.

The tray 102 has one or more levers 104 coupled thereto for moving the tray 102 between the storing position and the deploying position. Specifically, the tray 102 includes a proximal end portion 106 and a distal end portion 108 opposite to the proximal end portion 106. In addition, the lever 104 is comprised of a force arm 110, a resistance arm 112, and a fulcrum portion 114 therebetween. The resistance arm 112 of the lever 104 is coupled to the distal end portion 108 of the tray 102 for raising or lowering the distal end portion 108 of the tray 102. In this embodiment, the fulcrum portion 114 is pivotally coupled to a distal anchor member 116, which is fixedly mounted to a surface 30' of the storage area 30. In this way, the lever 104 forces the distal end portion 108 of the tray 102 to move along a generally upward arcuate path. For this reason, the resistance arm 112 preferably is substantially horizontal when the tray 102 is midway between the storing position and the deploying position. As one skilled in the art will understand, this feature can maximize the amount by which the tray 102 is tilted while minimizing the amount of lever rotation for doing so. Additionally, in this embodiment, the force arm 110 has a pedal portion 134 attached thereto for allowing an operator to step on the pedal portion 134 and move the tray 102 between the storing position and the deploying position. However, it is understood that the lever 104 can instead be actuated by a variety of other suitable mechanisms. For instance, a solenoid device, a hydraulic device, an electronic servo device, other suitable mechanisms, or any combination thereof can actuate the lever 104 as desired.

The proximal end portion 106 of the tray 102 is coupled to a proximal anchor member 120 via a linkage bar 122. As mentioned above, the proximal anchor member 120 is attached to the surface 30' of the storage area 30. In this way, the proximal anchor member 120 secures the tray 102 to surface 30' of the storage area 30 while allowing the tray 102 to be tilted as the distal end portion 108 is pivoted generally along its arcuate path. As shown in FIG. 14A, the linkage member 122 has a first end 122' and a second end 122" that is opposite to the first end 122'. In this embodiment, the first end 122' is pivotally coupled to the tray 102, and the second end 122" is pivotally coupled to the proximal anchor member 120. In this way, the tray 102, the linkage bar 122, and the proximal anchor member 120 are configured for moving the proximal end portion 106 of the tray 102 along an arcuate path upward and then downward to the original height. Specifically, the linkage bar 122 preferably is substantially vertical when the tray is midway between the storing position and the deploying position. For that reason, the proximal end portion 106 is positioned at the same height in the storing position as it is in the deploying position. This feature is advantageous because it allows the tray 102 to be aligned with the cart carrier 32 when the tray 102 is in both the deploying position and the storing position. In this regard, the galley cart 20 can be smoothly transferred between the cart carrier 32 and the tray 102 without having to first lift the galley cart before rolling the galley cart into the receiving container.

In another embodiment as shown in FIG. 14B, the first end 122' of the linkage bar 122 is pivotally coupled to the proximal anchor member 120, and the second end 122" of the linkage bar 122 is pivotally coupled to the tray 102. For that reason, it will be appreciated that the tray 102, the linkage bar 122, and the proximal anchor member 120 are configured for moving the proximal end portion 106 along an arcuate path, generally downward and then upward to the original height.

Also, as shown in another embodiment illustrated in FIG. 14C, the proximal end portion 106 can be coupled to the surface 30' of the storage area 30 via a slot and pin fastening pair 122''' integrated within the proximal anchor member 120. However, it is understood that various other constructions can be utilized for coupling the proximal end portion 106 of the tray 102 to the surface 30' of the storage area 30.

Figure 15:
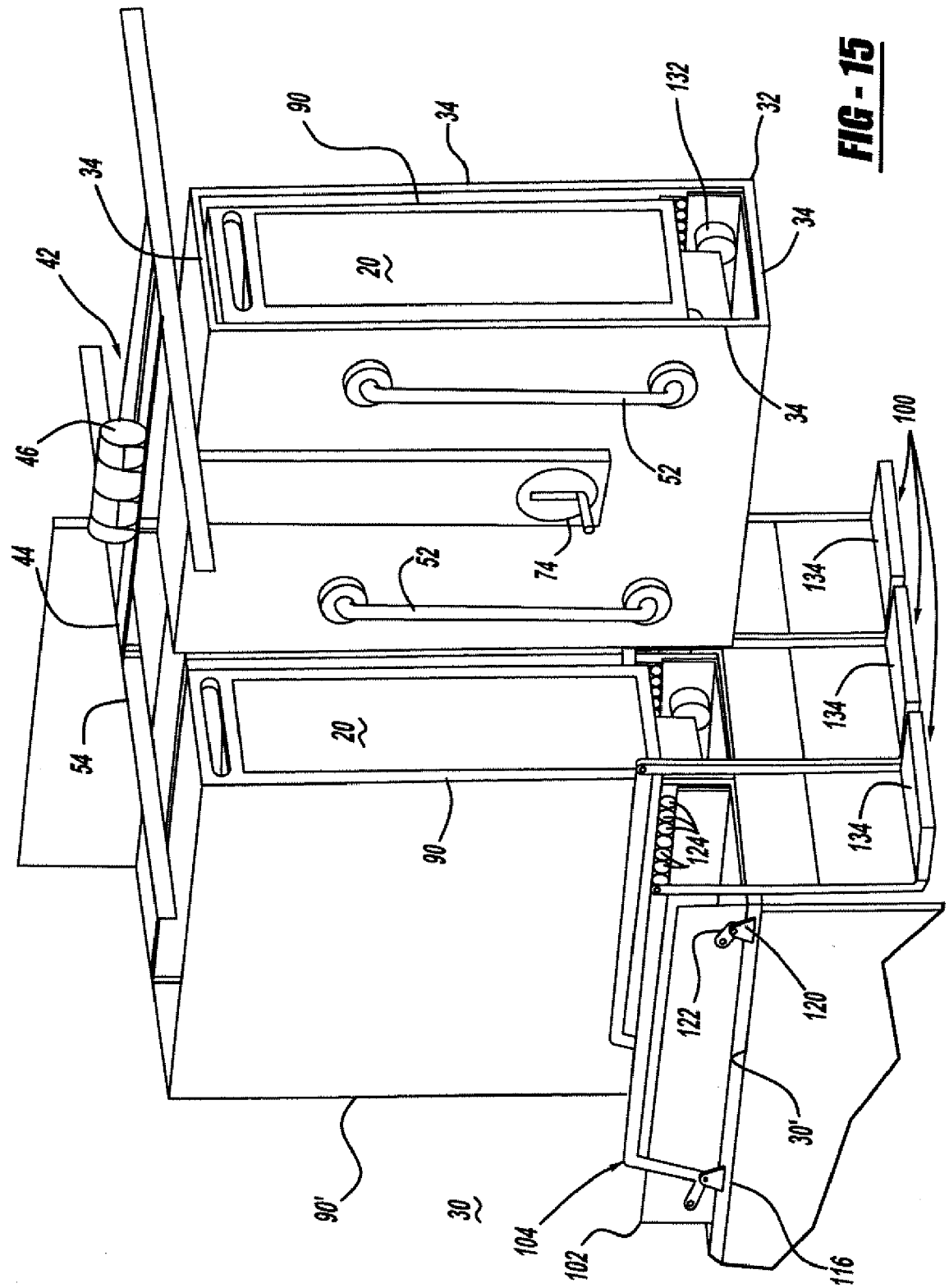
FIG. 15 is a cutaway perspective view of the overhead sub-module with a series of the deployable receptacles shown in FIGS. 11A and 11B.
Figure 16:
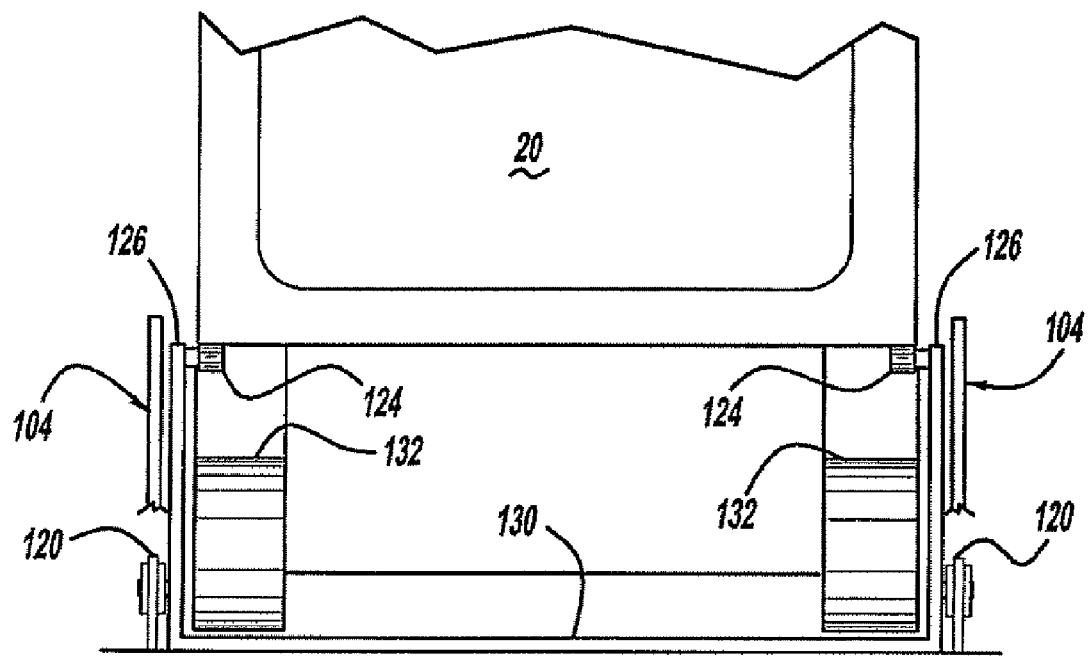
FIG. 16 is a front view of the deployable receptacle shown in FIG. 11A with a galley cart supported thereon.

Referring now to FIGS. 15 and 16, the tray 102 includes a series of roller members 124 extending from a pair of ledge portions 126 of the tray 102 for supporting a bottom portion 128 of the galley cart 20, according to one embodiment of the claimed invention. These roller members 124 allow the galley cart 20 to readily move into the tray 102 when the tray 102 is in the storing position and also to readily move the galley cart 20 out of the tray 102 when the tray 102 is tilted in the deploying position. However, in another embodiment, the tray 102 has pan portion 130 upon which the wheels 132 of the galley cart 20 are supported. In that way, the tray 102 allows the wheels 132 of the galley cart 20 to roll across the pan portion 130 as the galley cart 20 is moved between the deployable receptacle 100 and the cart carrier 32.

Figure 17:
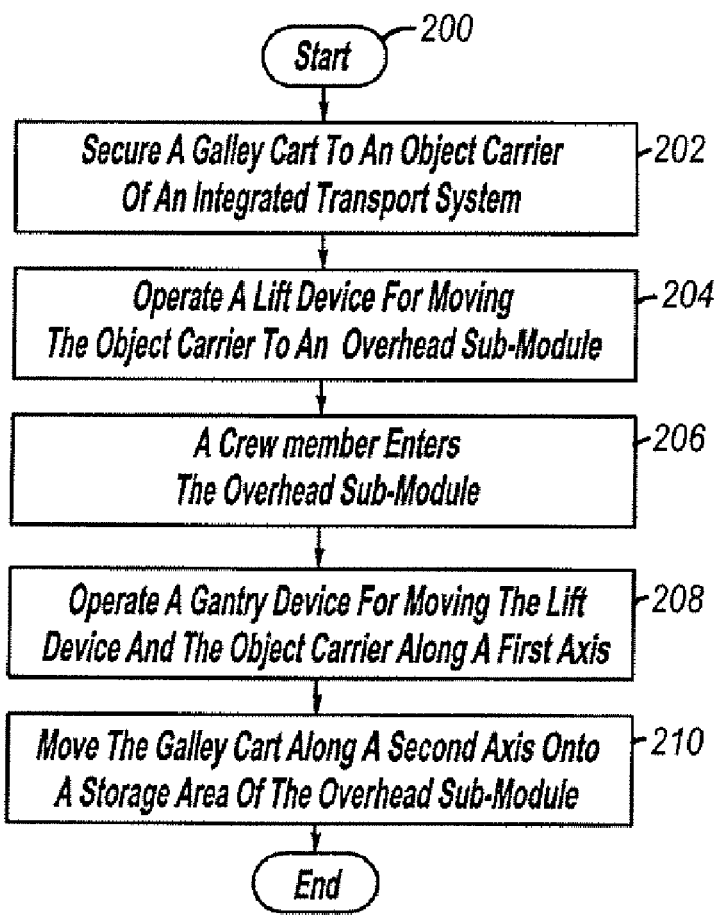
FIG. 17 is a logic flow diagram illustrating a method for operating the integrated transport system shown in FIG. 4A–4D.

Referring now to FIG. 17, there is shown a logic flow diagram for a method for operating the integrated transport system 14 shown in FIGS. 4A–4D. The method begins in step 200 and then immediately proceeds to step 202.

In step 202, the galley cart 20 is secured to the cart carrier 32. In this embodiment, this step is accomplished by rolling the galley cart 20 onto the cart carrier 32 through an open face 36 of the box construction comprising the cart carrier 32. As explained above, the cart carrier 32 has one or more restraint members for securing the galley cart 20 to the cart carrier 32. These restraint members are a series of interconnected plates 34, which define the cart carrier 32 itself. Additionally, the restraint members include a rope member 38 is secured across the open face 36 to prevent the galley cart 20 from inadvertently rolling through the open face 36 and out of the cart carrier 32. However, as explained above, the restraint members can be various other suitable mechanisms as desired. Then, the sequence proceeds to step 204.

In step 204, a crewmember operates the lift device 46 for moving the cart carrier 32 and the galley cart 20 upward along the longitudinal axis 22 of the shaft 24. This lift device 46 is a motorized pulley mechanism with sufficient power for lifting the cart carrier 32 and a substantially heavy galley cart 20. However, it is contemplated that the lift device 46 can be various other suitable mechanisms, motorized or manually operated, as described hereinabove. Then, the sequence proceeds to step 206.

In step 206, the crewmember climbs the ladder 48 and enters the overhead sub-module 18 via the walkway 50.

This crewmember stands on the walkway 50 and waits for the cart carrier 32 to arrive within the overhead sub-module 18. The sequence then proceeds to step 208.

In step 208, the crewmember operates the gantry device 44 for moving the lift device 46, the cart carrier 32, and the galley cart 20 along the first axis 26 of the overhead sub-module 18. This gantry device 44 can be a manually operated device comprised of a pair of rails 54 mounted to the overhead sub-module and also attached to the lift device 46 via one or more sliding members 60 or rolling members 56. The gantry device 44 is manually operated. Specifically, the cart carrier 32 includes one or more handles 52 for allowing the crewmember to move the cart carrier 32, the galley cart 20, and the lift device 46 along the rails 54. In another embodiment, the gantry device 44 is a motorized device. The sequence then proceeds to step 210.

In step 210, the crewmember moves the galley cart 20 along the second axis 28 from the cart carrier 32 to the open section of the storage area 30. This step is accomplished by the crewmember grabbing hold of the galley cart 20 through the opening 40 of the cart carrier 32 and pushing or pulling the galley cart 20 onto the available section of the storage area 30. However, as exemplified above, this step can be accomplished utilizing various un-lading mechanisms integrated within the cart carrier 32 as desired.

It will be appreciated that a crewmember can retrieve a galley cart 20 from the storage area 30 by reversing the order of steps 200–210.

While particular embodiments of the invention have been shown and described, numerous variations and alternate embodiments will occur to those skilled in the art. Accordingly, it is intended that the invention be limited only in terms of the appended claims.

The invention claimed is:

1. An aircraft comprising: an airframe including a bi-level galley module with a main-deck sub-module and an overhead sub-module disposed above said main-deck sub-module, said overhead sub-module for storing at least one object therein and having a first axis and a second axis disposed generally perpendicular to said first axis;
   a shaft defined by said bi-level galley module and extending between said main-deck sub-module and said overhead sub-module, said shaft having a longitudinal axis;
   an integrated transport system for moving an object through said shaft and between said main-deck sub-module and said overhead sub-module, said integrated transport system including a single-unit gantry-lift device comprised of a lift device for moving said object along said longitudinal axis and a gantry device for moving said object along at least one of the group consisting of said first axis and said second axis;
   a ladder extending between said main-deck sub-module and said overhead sub-module for allowing ingress and egress to said overhead sub-module;
   a walkway extending generally along said first axis of said overhead sub-module;
   at least one storage area disposed adjacent to said walkway and offset therefrom in a direction generally along said second axis of said overhead sub-module, said at least one storage area also being located above said walkway; and
   at least one deployable receptacle disposed within said at least one storage area, said at least one deployable receptacle including a tray and a lever coupled to said tray, said tray for supporting an object thereon and being movable between a storing position and a deploying position, said tray storing said object when said tray is disposed in said storing position and deploying said object when said tray is disposed in said deploying position, said lever coupled to said tray for moving said tray between said storing position and said deploying position;
   wherein said single-unit gantry-lift device further includes an object carrier for receiving said object, said object carrier having at least one restraint member for securing said object in said object carrier and an unloading mechanism for unloading said object from said object carrier;
   wherein said gantry device includes a pair of rails coupled to said overhead sub-module, said pair of rails for suspending said object carrier therefrom and preventing said object carrier from tipping, said pair of rails further utilized for moving said object carrier generally along said first axis of said overhead sub-module.

2. The aircraft recited in claim 1 wherein said tray includes at least one supporting surface for supporting said object.

3. The aircraft recited in claim 2 wherein said at least one supporting surface is substantially horizontal when said tray is disposed in said storing position and said at least one supporting surface is tilted at a predetermined angle when said tray is disposed in said deploying position.

4. The aircraft recited in claim 3 wherein said at least one supporting surface is a pan portion of said tray for supporting a series of wheels extending from said object and allowing said series of wheels to roll thereon.

5. The aircraft recited in claim 3 wherein said at least one supporting surface is a pair of opposing ledge portions of said tray with a series of rolling members coupled thereto, said series of roller members for contacting a bottom portion of said object and moving said object thereacross.

6. The aircraft recited in claim 1 wherein said tray has a distal end portion and a proximal end portion opposite to said distal end portion, said lever including a force arm, a resistance arm, and a fulcrum portion therebetween, said resistance arm being coupled to said distal end portion of said tray.

7. The aircraft recited in claim 6 wherein said resistance arm of said lever is pivotally coupled to said distal end portion of said tray.

8. The aircraft recited in claim 6 wherein said resistance arm of said lever is substantially horizontal when said tray is disposed midway between said storing position and said deploying position thereby minimizing an angle rotation of said lever and maximizing a height change of said distal portion of said tray when said lever is actuated to move said tray from said storing position to said deploying position.

9. The aircraft recited in claim 6 further comprising:
   a distal anchor member coupled to said fulcrum portion of said lever; and
   a proximal anchor member coupled to said proximal end portion of said tray.

10. The aircraft recited in claim 9 wherein said distal anchor member of said proximal anchor member comprise a one-piece base for mounting said tray thereon.

11. The aircraft recited in claim 9 wherein said proximal anchor portion is pivotally coupled to said proximal end portion of said tray, said proximal end portion moving along an arcuate path when said tray is moved between said storing position and said deploying position.

12. The aircraft recited in claim 9 wherein said proximal anchor portion of said base member is slidably coupled to said proximal end portion of said tray so as to allow said proximal end portion to move in substantially horizontal path.

13. The aircraft recited in claim 9 wherein said proximal anchor portion of said base member is coupled to said proximal end portion of said tray via at least one of the group consisting of a pin and slot fastening pair and a linkage bar.

14. The aircraft recited in claim 1 wherein said lever is coupled to at least one of the group consisting of a solenoid device, a hydraulic device, an electronic servo device, and a pedal portion for actuation by a person.

* * * * *